US006373179B1

(12) United States Patent
Makienko et al.

(10) Patent No.: US 6,373,179 B1
(45) Date of Patent: Apr. 16, 2002

(54) LASER CATHODE-RAY TUBE

(75) Inventors: O. M. Makienko, Fryazino; N. G. Rumyantsev, Shelkovo, both of (RU)

(73) Assignee: Samsung Display Devices Co., Ltd., Suwon-si (KR)

( * ) Notice: Subject to any disclaimer, the term of this patent is extended or adjusted under 35 U.S.C. 154(b) by 0 days.

(21) Appl. No.: 09/243,176

(22) Filed: Feb. 2, 1999

(30) Foreign Application Priority Data

Feb. 4, 1998 (RU) .......................................... 98102521

(51) Int. Cl.[7] ............................ H01J 29/70; G09B 1/04
(52) U.S. Cl. ........................ 313/421; 315/379; 315/373
(58) Field of Search ................................ 313/421, 425, 313/379, 370, 387; 315/379, 373, 369, 383, 382

(56) References Cited

U.S. PATENT DOCUMENTS 3,558,956 A 1/1971 Basov et al. .................. 313/92
4,695,332 A * 9/1987 Gordon et al. .............. 437/126
5,280,360 A 1/1994 Derdyra et al. ............. 358/242
5,374,870 A * 12/1994 Akhekyan et al. .......... 313/463
5,687,185 A * 11/1997 Kozlovsky et al. ........... 372/43
5,877,583 A * 3/1999 Meglio et al. ................ 313/35

* cited by examiner

*Primary Examiner*—Frank G. Font
*Assistant Examiner*—Layla Lauchman
(74) *Attorney, Agent, or Firm*—Christie, Parker & Hale, LLP

(57) ABSTRACT

There is proposed laser cathode-ray tube for simplification of its electrical circuit and lower manufacturing cost of its apparatuses, provided with an electron gun having a cathode for generating an electron beam; a laser screen having a laser target, of semiconductor plate, a focusing system for focusing the electron beam on the laser target, a deflection system for deflecting the beam and a cooling system for cooling the laser target, characterized in that the cathode is connected substantially to ground potential and the laser target is connected to high positive potential.

24 Claims, 1 Drawing Sheet

LASER CATHODE-RAY TUBE

BACKGROUND OF THE INVENTION (a) Field of the Invention

The invention relates to electronic and quantum devices, and more particularly, to laser cathode-ray tubes (CRT), e.g. , used in projection television systems for displaying images on large screens.

(b) Description of the Related Art

Projection television apparatuses based on conventional cathode-ray tubes having a phosphor screen are widely used for displaying images on the projective screens having an area of up to several square meters. However, the size of an image on the projective screens of the television apparatuses is limited because the phosphor screens of the projective apparatuses cannot form light flux of high intensity, thus making it difficult to form television images having required brightness and contrast.

An effective way to improve the parameters of projection television systems is concerned with using laser CRT's (see, for example, U.S. Pat. No. 3,558,956).

As distinct from the conventional CRT's, the source of radiation in the laser CRT is a laser target, not a luminophor layer, the laser target being a thin semiconductor monocrystalline plate having both of its parallel surfaces covered by light reflecting coatings. A fully reflecting metal coating mirror is usually applied to the surface on which the electron beam is incident, while the opposed side of the plate is covered with a semitransparent mirror coating. The mirror surfaces constitute an optical resonator, while the semiconductor plate between them acts as an active medium of the laser with electron-beam excitation (pumping). The laser target is fixed to a substrate of a transparent dielectric material, the substrate serving as the optical output window of the laser CRT and also as a heat sink for the laser target. A cooling system is connected to the substrate to cool the laser target on which a great amount of heat is generated under the action of the high energy electron beam. The substrate is usually made of material having a high thermal conductivity at low temperatures, such as sapphire. The laser target and the transparent substrate constitute the laser screen of the laser CRT (laser screen).

The electron beam penetrates the metal coating into the semiconductor plate and induces spontaneous light radiation. When the current density of the laser target surface produced by the electron beam exceeds a threshold value, the power of the induced light radiation will be greater than the losses in the optical resonator and the element of the laser target on which the electron beam is incident will generate laser radiation. When light bounces repeatedly through the resonator, its spectrum narrows, with the result that the emitted light is monochromatic. The laser light is radiated through the semitransparent mirror coating perpendicularly to the surface of the semiconductor plate and leaves the CRT through the sapphire output window.

In U.S. Pat. No. 5,280,360 a laser CRT is described, the CRT including a cathode for generating an electron beam, a laser screen including a laser target of semiconductor plate placed on a face of a transparent dielectric substrate, a focusing system for focusing the electron beam on the laser target, the cooling system being connected to the side surface of the substrate.

The method of exciting the screen of the laser CRT according to the above-mentioned patent comprises generating an electron beam and directing this beam on an element of the laser screen.

For required acceleration of the electron beam, the laser target shall be under a high positive potential (about 50–70 KV) with respect to the cathode. In the known laser CRT the cathode is connected to a source of a high negative potential and the laser target is grounded. Such a scheme of feeding the accelerating voltage enables the laser screen to be easily connected to the grounded system for cooling the laser target.

However, applying the high potential to the cathode extremely complicates the electrical circuits connected to the cathode and to the electrodes located near the cathode. Such circuits include, for example, cathode filament supply circuits, video signal amplifiers, bias voltage sources. The complication of these electrical circuits is caused by the necessity to take measures for electrically isolating these circuits from the ground and results in higher manufacturing expenses and thus higher cost of the apparatuses based on such laser CRT's.

SUMMARY OF THE INVENTION

The principle object of the invention is to provide a laser CRT and a method for exciting its screen, wherein the high accelerating voltage is applied in such a way as to provide the possibility of grounding the electrical circuits connected to the cathode of the CRT and thus permit their simplification and decrease in the cost of the apparatuses based on the laser CRT.

With these principle object in view, there is proposed a laser CRT provided with an electron gun having a cathode for generating an electron beam, a laser screen having a laser target of semiconductor plate, a focusing system for focusing the electron beam on the laser target, a deflection system for deflecting this beam and a cooling system for cooling the laser target, wherein, according to the invention, the cathode is connected substantially to ground potential and the laser target is connected to high positive potential.

The cooling system in the proposed laser CRT is substantially to the ground potential.

From the laser target the cooling system is isolated by an electrical isolator.

The laser screen of the CRT includes a transparent dielectric substrate constituting said isolator and the laser target being fixed to one of the end faces of the substrate, while the cooling system is connected to a peripheral portion of the opposite face of the substrate.

Connection of the cooling system with the substrate end face opposite to the laser target, instead of with its side surface, as in the known laser CRT, allows the dielectric substrate of the laser target to be used as means ensuring reliable electrical isolation of the latter from the cooling system and thus makes it possible to apply high positive potential to the laser target, while the cooling system remains grounded. In this design the side surface of the substrate, unlike known designs, has no metal coating.

The cooling system is preferably connected to said periphery of the substrate face through a metal flange.

The metal flange is preferably connected to the second metal flange soldered in the bulb of the CRT.

The transparent substrate is preferably made as a sapphire disc.

The high potential is preferably applied to the laser target by the high voltage input device connected to the laser target through a conductive cylinder made of non-magnetic material and positioned in longitudinally coaxial line with the CRT.

The conductive cylinder edge connecting the laser target is preferably provided with at least one contact spring.

The proposed laser CRT may further comprise a dielectric cylinder having a greater diameter than the conductive cylinder and enclosing a conductive cylinder portion adjoining the laser target, the dielectric cylinder being fixed to peripheral portion of the transparent substrate face joining the laser target co-axially with respect to the conductive cylinder.

The inner surface of the CRT casing between the high potential input device and the second metal flange is preferably coated with a non-conductive coating for preventing surface discharges.

The outer area of the tube casing around the high potential input device is preferably covered with isolating compound.

With the above principle in view, there is also proposed a method for exciting the screen of a laser CRT, wherein an generated electron beam is directed on an element of the laser target for exciting the laser radiation, in which method, according to the invention, the electron beam is generated with a cathode connected substantially to ground potential, while the laser target is connected to a high positive potential.

BRIEF DESCRIPTION OF THE DRAWINGS

The accompanying drawings, which are included to provide a further understanding of the invention and are incorporated in and constitute a part of this specification, illustrate a particular embodiment of the invention and, together with the description, serve to explain the principles of the invention.

DETAILED DESCRIPTION OF THE PREFERRED EMBODIMENTS

Figure 1:
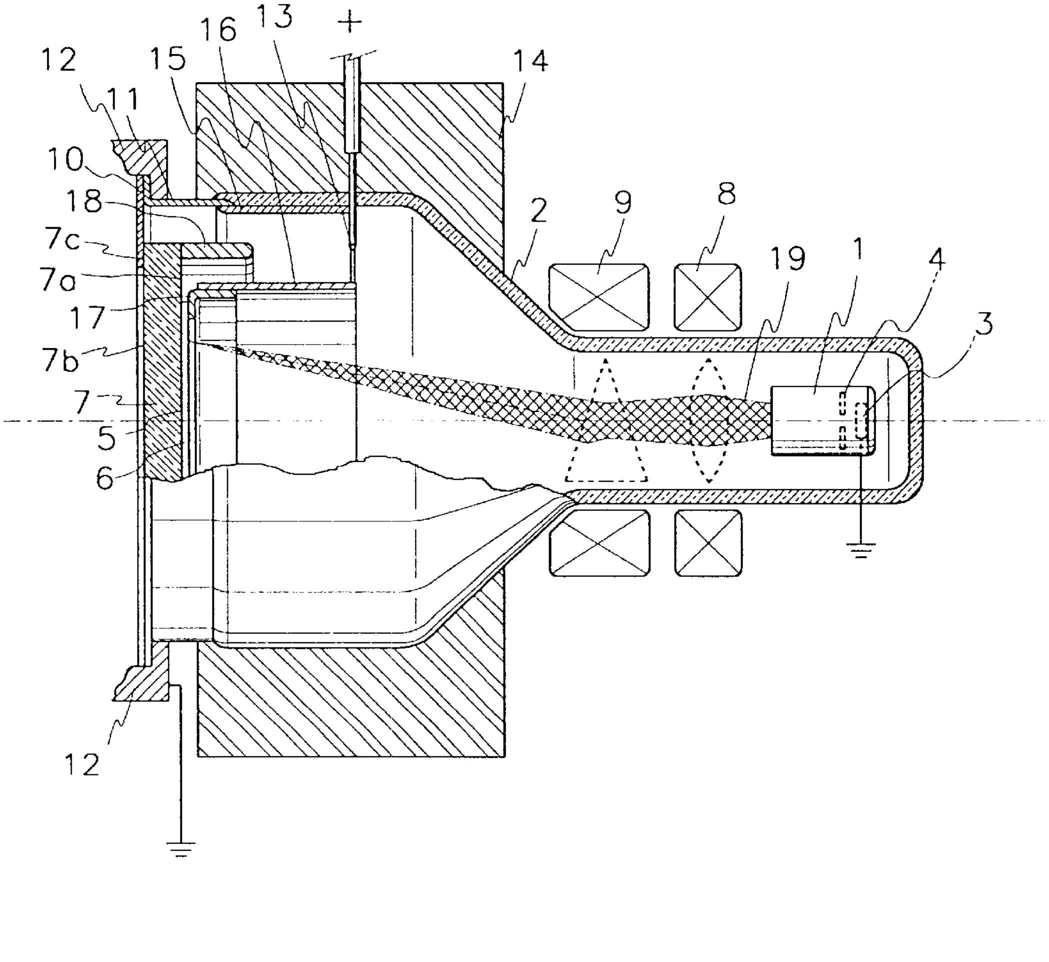
FIG. 1 is a partial sectional view of the laser CRT according to an embodiment of the present invention.

Reference will now be made in detail to the preferred embodiments of the present invention, examples of which are illustrated in the accompanying drawing.

A laser CRT shown in FIG. 1 contains an electron gun 1 installed in the neck of a glass casing (bulb) 2 of the CRT and including a cathode 3 for generating an electron beam, the cathode 3 being connected—to ground potential, and a modulator 4 for controlling the beam current, i.e. for modulating the beam. The modulator 4 is connected to a video signal source (not shown). The cathode 3 and modulator 4 may have a conventional design used in known laser CRT's.

The laser CRT further comprises a laser screen 5 at a distance from the electron gun 1 and a laser target 6 bonded to a surface 7*a* of a transparent sapphire substrate 7 made in a form of a disc. The laser target 6 is a thin flat semiconductor monocrystalline plate having both—surfaces covered with light reflecting coatings. A fully reflecting metal-dielectric coating is applied to one surface of the plate facing the electron gun and the other surface,facing the transparent substrate 7, is covered with a semitransparent dielectric coating.

The laser CRT also comprises an electromagnetic focusing system 8 for focusing the electron beam on the laser target 6, and an electromagnetic deflection system 9 including coils (not shown) for vertical and horizontal deflection of the focused electron beam. The focusing system 8 and the deflection system 9 are mounted on the outer surface of the neck of the bulb 2.

The peripheral portion of the substrate surface 7*b* opposite to the laser target 6 is hermetically connected along its perimeter to a metal flange 10 which is, in turn, hermetically connected to a second metal flange 11 hermetically soldered to the glass bulb 2 of the CRT. The flanges 10 and 11 may be made of covar and connected to each other by soldering or welding. The substrate 7 may be connected to the flange 10 at a soldered seam 7*c*. A flange 12 of a cooling system is mechanically connected, e.g. by welding, to the circumferential side of the flange 10. The cooling system may be of a conventional type and may, e.g., include a channel for passing a cooling medium.

The flange 10 and the cooling system connected to the flange 10 through the flange 12 are, like the cathode 3, connected to the ground potential.

A high-voltage input device 13 for applying to the laser target 6 positive potential higher than ground is located at a point on the bulb 2 at a distance from the flange 11. The high-voltage input device is constituted by a metal pin 13 soldered in the glass of the bulb 2. The pin end located outside the bulb 2 is connected to a source of high positive potential (about 30–70 kV). The outer surface of the bulb 2 around the pin 13 and the flange 11 is covered with a dielectric coating 15 for preventing surface discharges. This coating may be made of chrome oxide. The distance from the pin 13 to the metal flange 11 is determined such as to prevent electrical breakdown between these elements. The pin end located inside the bulb 2 is connected to one end of a cylindrical screen 16 made of non-magnetic conductive material and positioned in longitudinally coaxial line with the laser screen. Around the circumference of the other end of the screen 16, contact springs 17 are arranged to ensure reliable electrical contact of the screen 16 with the fully reflecting metal coating of the laser target 6. The length of the cylindrical screen 16 is approximately the distance between the pin 13 and the laser target 6. The diameter of the cylindrical screen 16 is not less than that of the laser target 6 to allow the electron beam pass through the cylinder without colliding to the inner wall of the cylinder. To prevent discharge/arc between the screen 16 and the flange 10, a dielectric cylinder 18 having a greater diameter than that of the screen 16 is fixed to the transparent substrate 7 such that it partially ans coaxially encloses the cylindricalscreen 16. The portion of the screen 16 nearest to the flange 10 is thus enclosed by the dielectric cylinder 18.

The laser CRT operates as follows. The electron gun 1 generates an electron beam 19, the current of the beam 19 depending on the video signal voltage applied to the modulator 4 of the electron gun 1. Because the cathode 3 of the CRT is at the ground potential, standard video amplifiers having grounded common wires and similar to those used in television devices with conventional projective luminescent CRT's can be connected to the modulator 4 without their electrical isolation with respect to the grounding. Other circuits usually connected to electron guns (filament voltage source) also may be conventional circuits having grounded common wires and used usually with CRT's.

A higher- than-ground positive voltage is applied to the laser target 6 through the high-voltage input 13. The metal flange 10 is electrically isolated from this voltage by the dielectric sapphire substrate 7, the portion of the glass bulb 2 having the coating 15, the dielectric cylinder 18 and the compound 14.The electron beam 19 under the influence of the—is directed to the laser target 6. The current passing inthe electromagnetic coil of the focusing system 8 provides pointed magnetic focusing of the electron beam 19 on the laser target 6. In magnetic focusing, the magnetic fields formed by the focusing system 6 constitute magnetic lens (shown by the dashed line) which collects the divergent electron beam generated by the electron gun 1 into a narrow converging beam.

The coils of the deflection system 9 are applied with horizontal and vertical scanning signals of a saw-tooth form. The magnetic fields of the electromagnetic coils deflect the electron beam 19 in horizontal and vertical directions, which provides forming a television raster, much as it is formed in ordinary cathode-ray tubes. The intensity of the radiation from an element of the screen 5 is proportional to the electron beam current density which, in turn, is dependent on the video signal voltage applied to the modulator 4 of the electron gun 1. The synchronized supply of the laser CRT with scanning and video signals provides formation of a television image projected from the laser CRT to an external projective screen (not shown).

The cooling system cools the laser target 6 to a predetermined temperature. This helps to lower the threshold current density on the laser target 6 and increases the intensity of the CRT light radiation. Because the cooling system is connected to the meal flange 10, which is at the ground potential and electrically isolated from the high positive voltage, the cooling system may be grounded and have a standard design. Using sapphire as the material for the substrate 7 allows the laser target 6 to be effectively cooled because of high thermal conductivity of sapphire under low temperature. Thus, connection of the cooling system to the surface of the substrate 7 opposite to the laser target 6, instead of to its circumferential sideas in prior art laser CRT's, allows the dielectric substrate 7 to be additionally used to electrically isolate the laser target 6 from the cooling system, and thus it is possible to applyhigh positive potential to the laser target 6 with the cooling system grounded. The cathode 3 in the inventive laser CRT is also at the ground potential, which provides, as mentioned above, simplification of the electrical circuits connected to the CRT and thus lowers the production cost of the apparatuses.

The described design of the laser CRT with magnetic focusing and deflection of the electron beam is presented only as an example. In the device and method according to the invention any conventional methods of generation, focusing and deflection of electron beams, such as used in cathode-ray tubes and other similar devices, can be used. Laser targets of various types can also be used.

The above said laser CRT with its cathode grounded induces simplification of electrical circuit and lower manufacturing cost of the apparatuses.

It will be apparent to those skilled in the art that various modifications and variations can be made in the present invention without departing from the sprit or scope of the invention. Thus, it is intended that the present invention cover modifications and variations of this invention provided they come within the scope of the appended claims and their equivalents. This application is based on application Ser. No. 98102521/09 Russian Patent Office on Feb. 4, 1998, the content of which is incorporated herein by reference.

What is claimed is:

1. A laser cathode ray tube comprising:

an electron gun having a cathode for generating an electron beam;

a laser screen having a laser target;

a focusing system for focusing the electron beam on the laser target;

a deflection system for deflecting the electron beam; and a cooling system for cooling the laser target, wherein the cathode and the cooling system are respectively connected to a ground potential, and the laser target is electrically connected to a source of high positive potential.

2. The laser cathode ray tube according to claim 1, wherein the laser screen includes a transparent dielectric substrate constituting an isolator electrically isolating the laser target from the cooling system, the laser target being fixed to one surface of the substrate, while the cooling system is connected to the other surface the substrate.

3. A laser cathode ray tube comprising:

an electron gun having a cathode for generating an electron beam;

a laser screen having a laser target;

a focusing system for focusing the electron beam on the laser target;

a deflection system for deflecting the electron beam; and a cooling system for cooling the laser target, wherein the cathode is connected to ground potential, and the laser target is electrically connected to a source of high positive potential and includes transparent dielectric substrate constituting an isolator electrically isolating the laser target from the cooling system, the laser target being fixed to one surface of the substrate, while the cooling system is connected to the other surface of the substrate, and wherein the cooling system is thermally connected to a periphery of the substrate face with a metal flange as an intermediary.

4. The laser cathode ray tube according to claim 3, wherein the metal flange is connected to a second metal flange soldered to the cathode ray tube.

5. The laser cathode ray tube according to claim 2, wherein the transparent substrate is formed of a sapphire disk.

6. A laser cathode ray tube (CRT) comprising:

an electron gun having a cathode for generating an electron beam;

a laser screen having a laser target;

a focusing system for focusing the electron beam on the laser target;

a deflection system for deflecting the electron beam; and a cooling system for cooling the laser target, wherein the cathode is connected to ground potential and the laser target is electrically connected to a source of high positive potential electrically connected to the laser target via a conductive cylinder made of non-magnetic material and positioned co-axially with the CRT.

7. The laser cathode ray tube according to claim 6, wherein the conductive cylinder has an edge contacting the laser target and is provided with at least one contact spring.

8. The laser cathode ray tube according to claim 7, wherein the CRT comprises a dielectric cylinder having a greater diameter than that of the conductive cylinder and enclosing a portion of the conductive cylinder, the dielectric cylinder being fixed on the substrate.

9. The laser cathode ray tube according to claim 4, wherein a portion of the inner surface of the tube casing between a high potential input device and the second metal flange is coated with a non-conductive material for preventing surface discharges.

10. The laser cathode ray tube according to claim 1, wherein an outer area of a bulb of the tube where the source of high positive potential is located is covered with electrically isolating compound.

11. A method for exciting the screen of a laser CRT, wherein an electron beam is generated and directed on an element of the laser target for exciting laser radiation, characterized in that the electron beam is generated by an electron gun having a cathode connected substantially to ground potential, while the laser target is connected to a high positive potential.

12. A laser cathode ray tube comprising:

an electron gun having a cathode for generating an electron beam;

a laser screen having a laser target;

a focusing system for focusing the electron beam on the laser target;

a deflection system for deflecting the electron beam; and a cooling system for cooling the laser target, wherein the cathode and the cooling system are respectively connected to a first potential and the laser target is connected to a second potential, said first potential being ground and said second potential being positive with respect to said first potential.

13. The laser cathode ray tube according to claim 12, wherein the laser target is isolated by an electrical isolator from the cooling system.

14. The laser cathode ray tube according to claim 13, wherein the laser screen includes a transparent dielectric substrate comprising the electrical isolator, the laser target being fixed to one surface of the transparent dielectric substrate, while the cooling system is connected to another surface of the transparent dielectric substrate.

15. A laser cathode ray tube comprising:

an electron gun having a cathode for generating an electron beam;

a laser screen having a laser target;

a focusing system for focusing the electron beam on the laser target;

a deflection system for deflecting the electron beam; and a cooling system for cooling the laser target, wherein the cathode is adapted for connection to a first potential and the laser target is adapted for connection to a second potential, said second potential being positive with respect to said first potential, the laser target being isolated by an electrical isolator from the cooling system, the laser screen including a transparent dielectric substrate comprising the electrical isolator, the laser target being fixed to one surface of the transparent dielectric substrate, while the cooling system is connected to another surface of the transparent dielectric substrate, the cooling system being thermally connected to a periphery of said another surface of the transparent dielectric substrate with a metal flange as an intermediary.

16. The laser cathode ray tube according to clam 15, wherein the metal flange is connected to a second metal flange soldered to the cathode ray tube.

17. The laser cathode ray tube according to claim 14, wherein the transparent dielectric substrate comprises a sapphire disk.

18. The laser cathode ray tube according to claim 12, further comprising a source for said second potential, said source being electrically connected to the laser target via a conductive cylinder comprising a non-magnetic material, the conductive cylinder being positioned co-axially with the laser cathode ray tube.

19. A laser cathode ray tube comprising:

an electron gun having a cathode for generating an electron beam;

a laser screen having a laser target;

a focusing system for focusing the electron beam on the laser target;

a deflection system for deflecting the electron beam;

a cooling system for cooling the laser target, wherein the cathode is adapted for connection to a first potential and the laser target is adapted for connection to a second potential, said second potential being positive with respect to said first potential; and a source for said second potential, said source being electrically connected to the laser target via a conductive cylinder comprising a non-magnetic material, the conductive cylinder being positioned co-axially with the laser cathode ray tube, wherein the conductive cylinder has an edge contacting the laser target and at least one contact spring.

20. The laser cathode ray tube according to claim 18 or 19 further comprising a dielectric cylinder having a greater diameter than that of the conductive cylinder and enclosing a portion of the conductive cylinder, the dielectric cylinder being fixed on a transparent dielectric substrate of the laser screen.

21. The laser cathode ray tube according to claim 16, wherein a portion of an inner surface of the cathode ray tube connected between the second potential and the second metal flange comprises a non-conductive material coating for preventing surface discharges.

22. The laser cathode ray tube according to claim 12, wherein an outer area of a bulb portion of the cathode ray tube connected to the second potential comprises an electrically isolating compound.

23. A method for exciting a screen of a laser cathode ray tube, comprising the steps of:

generating an electron beam with an electron gun having a cathode connected to a substantially ground potential;

directing said electron beam on an element of a laser target for exciting laser radiation, said laser target being connected to a positive potential.

24. A laser cathode ray tube (CRT) comprising:

an electron gun having a cathode for generating an electron beam;

a laser screen having a laser target;

a focusing system for focusing the electron beam on the laser target;

a deflection system for deflecting the electron beam; and a cooling system for cooling the laser target, wherein the cathode is connected to ground potential and the laser target is electrically connected to a source of high positive potential, the source of high positive potential being electrically connected to the laser target via a conductive cylinder made of non-magnetic material, the conductive cylinder positioned co-axially with the CRT, wherein the CRT comprises a dielectric cylinder having a greater diameter than that of the conductive cylinder and enclosing a portion of the conductive cylinder, the dielectric cylinder being fixed on the substrate.

* * * * *